US012575628B2

(12) United States Patent
Sessoms et al.

(10) Patent No.: US 12,575,628 B2
(45) Date of Patent: Mar. 17, 2026

(54) TRANSVERSELY FOLDED MULTI SURFACE BRA SIZING DEVICE ENABLING THE DISPLAY OF BRA FITTING EDUCATIONAL INFORMATION

(71) Applicants: Carlisa Renee Sessoms, Roseville, CA (US); Michael Arnold Sesssoms, Roseville, CA (US)

(72) Inventors: Carlisa Renee Sessoms, Roseville, CA (US); Michael Arnold Sesssoms, Roseville, CA (US)

( * ) Notice: Subject to any disclaimer, the term of this patent is extended or adjusted under 35 U.S.C. 154(b) by 3 days.

(21) Appl. No.: 19/222,808

(22) Filed: May 29, 2025

(65) Prior Publication Data

US 2025/0288043 A1      Sep. 18, 2025

Related U.S. Application Data

(60) Provisional application No. 63/763,714, filed on Feb. 26, 2025.

(51) Int. Cl.
*A41H 1/02* (2006.01)
*G09B 19/00* (2006.01)
*G09B 29/00* (2006.01)

(52) U.S. Cl.
CPC ........... *A41H 1/02* (2013.01); *G09B 19/0076* (2013.01); *G09B 29/00* (2013.01)

(58) Field of Classification Search
CPC ....... A41H 1/02; G09B 19/0076; G09B 29/00
See application file for complete search history.

(56) References Cited

U.S. PATENT DOCUMENTS

| | | | |
|---|---|---|---|
| 6,336,839 B1 * | 1/2002 | Valli | A41H 1/02 |
| | | | 450/63 |
| 8,832,955 B2 | 9/2014 | Petter et al. | |
| 9,568,296 B2 | 2/2017 | Moore | |
| 10,973,271 B2 * | 4/2021 | D'Antonio | G01B 3/1061 |
| 12,185,782 B2 * | 1/2025 | Luthman | A41H 1/02 |
| 12,213,550 B2 * | 2/2025 | Sessoms | A41H 1/02 |
| 2022/0386728 A1 * | 12/2022 | Luthman | A41H 1/02 |
| 2024/0341387 A1 * | 10/2024 | Sessoms | A41H 1/02 |
| 2025/0288043 A1 * | 9/2025 | Sessoms | G09B 19/0076 |

FOREIGN PATENT DOCUMENTS

JP      3116577 U   * 12/2005

* cited by examiner

*Primary Examiner* — Yaritza Guadalupe-Mccall

(57) ABSTRACT

Disclosed is a device for determining a bra size. The device comprises a measuring strip with adjustable closure elements and is worn around the user's torso to compare the tightness and feel of different bra size measurements on the body. The bra size measurements are converted into bra sizes using charts located on the device. The improvement of the invention comprises the measuring strip of the device being transversely folded in a book-like fashion, allowing for a significant increase in the amount of surface area on the device to display bra fitting educational information. With the inclusion of bra fitting educational information directly on the device, the device is able to provide a complete bra fitting for the user.

9 Claims, 12 Drawing Sheets

|  | Bust 47 | Bust 47 |
| --- | --- | --- |
| Band | Support | Comfort |
| 32 | 32O (UK 32K) | 34N (UK 34JJ) |
| 33 | 34N (UK 34JJ) | 36M (UK 36J) |
| 34 | 34M (UK 34J) | 36L (UK 36HH) |
| 35 | 36L (UK 36HH) | 38K (UK 38H) |

| 36 | 36K (UK 36H) | 38J (UK 38GG) |
| --- | --- | --- |
| 37 | 38J (UK 38GG) | 40I (UK 40G) |
| 38 | 38I (UK 38G) | 40H (UK 40FF) |
| 39 | 40H (UK 40FF) | 42G (UK 42F) |
| 40 | 40G (UK 40F) | 42F/DDD (UK 42E) |
| 41 | 42F/DDD (UK 42E) | 44E/DD (UK 44DD) |

Bra Care and Bra Replacement

Proper bra care includes hand washing bras or using a lingerie mesh bag on the delicate cycle. Mild detergents preferably lingerie wash is recommended. Hang dry and reshape bra paddings while wet. Rotate the use of multiple bras so that the elastic does not stretch out prematurely. Some signs of when its time to replace a bra include: padded cups are starting to crinkle; the bra feels loose when being worn on the tightest hook; wires are poking through the cups; elastic fibers are starting to fray; the cups are stretched out; and the straps are too loose.

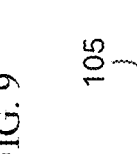
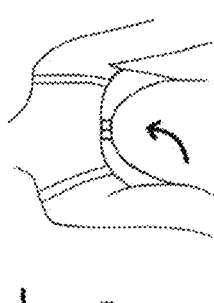
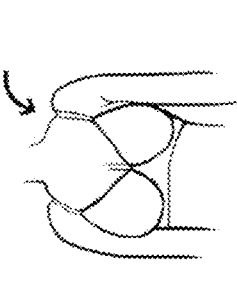

Straps digging into the shoulders.    Gapping in the cup.    Bra band riding up the back.    Spillage out of the top of the cup.

FIG. 10

TRANSVERSELY FOLDED MULTI SURFACE BRA SIZING DEVICE ENABLING THE DISPLAY OF BRA FITTING EDUCATIONAL INFORMATION

RELATED APPLICATION

This application claims a priority to U.S. Provisional Application No. 63/763,714 filed Feb. 26, 2025, which is incorporated by reference herein in its entirety.

FEDERALLY SPONSORED RESEARCH OR DEVELOPMENT

Not Applicable

NAMES OF PARTIES TO A JOINT RESEARCH AGREEMENT

Not Applicable

INCORPORATION BY REFERENCE OF MATERIAL SUBMITTED

Not Applicable

PRIOR DISCLOSURES BY THE INVENTOR OR A JOINT INVENTOR

Prior disclosures by the inventors related to this application include U.S. Provisional Application No. 63/459,055, U.S. Nonprovisional application Ser. No. 18/600,478, and U.S. Pat. No. 12,213,550 B2.

SEQUENCE LISTINGS

Not Applicable

TECHNICAL FIELD

The present invention relates to measuring and fitting devices for determining a bra size. More specifically the invention encompasses improvements related to bra fitting by allowing the device to transversely fold in a book-like fashion to increase the surface area for displaying bra fitting educational information directly on the device.

BACKGROUND

Since the invention of the "Brassiere" bras have been worn as a supportive undergarment for breasts. However, there have been challenges in establishing a way to educate individuals, particularly those not trained in the art of bra fitting, on how to accurately determine a correct bra size and style. Not only can bra fitting be improved if the tightness of the band and bust measurements are able to be felt on the body, but also if there is a clear and concise way to include educational bra fitting information directly on a bra fitting measuring device.

Finding a good fitting bra includes more than just determining the correct bra size. Body shape, bra styles, and proper bra fitting techniques are all important elements to consider when choosing a bra. Additional bra fitting information like sister sizes and showcasing extended bra sizes can also be useful for a person shopping for new bras.

An example of an application for bra fitting information would be matching specific breast shapes to relevant bra styles. The average person not trained in the art of bra fitting is typically unaware of how much breast shape determines which bra styles will fit the best. Different bra styles are engineered to cater to certain breast shapes. For example, a bra with side-seems or side panels in the cups is specifically designed for women whose breast may be fuller on the sides and want to shift the breast tissue toward the center of the chest wall. A shallow demi-cup bra may be very flattering on round shaped breast but may not be the wisest choice for individuals with pendulous shaped flaccid breast tissue. Asymmetrical shaped breast may benefit from bras with stretchy cups so that an insert can be used to even out the difference in size. These are just a few examples of why breast shapes need to be taken into consideration when choosing a properly fitting bra.

Bra fitting knowledge of how to properly adjust a bra's components on the body is also useful for individuals that are measuring themselves. For example, an individual may try on a bra in the correct size, but if the straps are not adjusted properly, or the entirety of the breast tissue is not inside of the cup, the individual may incorrectly ascertain that the bra does not fit. Another example is if an individual needs to wear a new bra on the tightest band hooks. New bras are typically worn on the loosest band hooks, as band hook increments are meant to be tightened over time as the bra stretches. Without this knowledge an individual who needs to wear a new bra on the tightest band hooks will not know that the band size they are wearing is too large. Knowledge on how to adjust a bra size is also needed. Not all bra manufactures feel the same on the body. Some bra brands may fit tighter or looser than other bra brands. Providing sister sizing for bra size measurements on a bra fitting device will help adjust the bra size to feel more relaxed or supportive if needed.

Additional bra fitting knowledge that may be helpful to include on a bra fitting device are bra style recommendations for particular outfits or apparel, benefits of different bra styles, proper bra care, signs of when it's time to replace a bra, signs of an ill-fitting bra, and how to properly use a measuring device. Trying to assimilate bra fitting information while doing mental calculations to determine a bra size can be overwhelming and frustrating for anyone untrained in the art of bra fitting. Other bra sizing devices do not typically include additional bra fitting educational information directly on the device. As such a bra sizing device that includes bra fitting educational information and size adjustments is needed.

DESCRIPTION OF PRIOR ART

There have been many attempts to provide solutions to bra fitting challenges. Some measuring tapes have been specifically engineered for the use of bra fitting such as in the case of U.S. Pat. No. 3,292,261 in the name of Hayes, U.S. Pat. No. 6,467,180 in the name of Chan, and U.S. Pat. No. 8,832,955 in the name of Petter. There have also been some inventions that allow the user to wear a device to determine their correct bra size such as in the case of U.S. Pat. No. 6,276,069 in the name of Chadwick, U.S. Pat. No. 5,414,943 in the name of Vogt, U.S. Pat. No. 9,568,296 in the name of Moore, Patent No. US20220386728 in the name of Luthman, and U.S. Pat. No. 2,946,125 in the name of Gittelson. However as previously stated, none of these inventions provide any additional bra fitting information outside of finding the correct bra size. Many of these devices do not readily show the measurement combinations of band to bust ratios that adjust the cup size according to the band size chosen. Some require the user to wear the device attached to their back which may be difficult for users with limited mobility. Some use spring systems which can mechanically malfunction. Some use multiple measuring tapes which may be less intuitive to use compared to the claimed invention. Some of these devices are intended to be used on bare breast which may be awkward if ever in the presence of a third party, such as with a bra fitting specialist. To address these issues, the disclosed subject matter provides an improved bra fitting device that is comprehensive and easy to use without the needed assistance from a third party.

SUMMARY

In the art of bra fitting, there is more to finding a good fitting bra besides determining the correct bra size. A complete bra fitting takes into account additional elements such as breast shape, complementing bra styles for different body types, the anatomy of a bra, and how to adjust different bra components on the body (e.g. how to adjust bra straps properly, how to adjust the bra cups around breast tissue, how to wear the bra band around the rib cage, etc.). Other bra fitting information that can be useful include: signs of an ill-fitting bra and how to fix the ill fit; how to adjust the bra size to a sister size if necessary; and the difference between different bra styles and what each bra style is used for.

It is the object of the disclosed invention to provide a comprehensive bra fitting device that includes educational bra fitting information. It is further the object of the disclosed invention to overcome or at least mitigate the issue of lack of sufficient surface area on a bra fitting measuring device that is necessary to display bra fitting educational information. The invention increases surface area available to display bra fitting information by transversely folding the measuring strip, allowing the measuring strip to open and close in a book like fashion. This allows the measuring strip to maintain a narrow footprint while closed when measuring the underbust and overbust measurements for a bra size. The measuring strip can then open to expose more surface area to display bra fitting information. If necessary, additional inserts of measuring strip material can be added to the inside of the device to increase display surface area much like pages are added to a book.

In certain embodiments, the invention disclosed is a bra size measurement device comprising a measuring strip, a first closure element, a row of second closure elements that are numbered and/or labeled, and a group of bra size measurement conversion charts. The improvement of the invention comprises the measuring strip made up of a length of continuous strip material having an outer top surface to which the row of second closure elements is attached, an inner top surface and an inner bottom surface where the group of bra size measurement conversion charts are located, and an outer bottom surface where additional bra fitting educational information may be displayed.

The outer top surface is on the reverse side of the inner top surface, and the outer bottom surface is on the reverse side of the inner bottom surface. The measuring strip is transversely folded or constructed in any fashion so that the measuring strip may open and close in a book-like fashion exposing the inner top surface and the inner bottom surface when in an open position. When the measuring strip is in a closed position and the inner top surface and the inner bottom surface are aligned and directly facing each other, the outer top surface, the inner top surface, the inner bottom surface, and the outer bottom surface are joined together and share a common top linear edge. The outer top surface and the inner top surface share a common bottom linear edge, and the inner bottom surface and the outer bottom surface share a common bottom linear edge, in which the common bottom linear edge of the outer top surface and the inner top surface is separated from the common bottom linear edge of the inner bottom surface and the outer bottom surface. The common top linear edge and the bottom linear edges are oppositely disposed and span the length of the strip material.

The measuring strip further includes a first side edge to which the first closure element is attached, the first side edge extending between a first end of the common top linear edge and a first end of the bottom linear edges. The first side edge closes and binds together a first end of the outer top surface, a first end of the inner top surface, a first end of the inner bottom surface, and a first end of the outer bottom surface on one side of the measuring strip. There is also a set of second side edges extending between a second end of the common top linear edge and a second end of the bottom linear edges. The set of second side edges are connected at the second end of the common top linear edge but are separated at the second end of the bottom linear edges.

In certain embodiments, additional layers of inner top surfaces and inner bottom surfaces may be added to the device by inserting measuring strip material within the fold of the device and adhering the additional material to the top linear edge of the device, or layers may be removed from the device so that the device may only have one front surface and one back surface.

In certain embodiments, there is an array of bra fitting educational information located on the surfaces of the measuring strip and an additional column on the charts that displays alternative bra sizes known as sister sizes. The sister sizes can be referred to under alternative nomenclature such as comfort and support sizes. The array of bra fitting educational information may include but is not limited to: different breast shape illustrations and descriptions with matching bra style recommendations; the anatomy of a bra and how to properly adjust the components of a bra on the body; signs of an ill-fitting bra; how to adjust the bra size according to how the bra is fitting on the body; how to find an alternative comfort size or sister size; bra style descriptions and suggested uses; proper bra care; signs of when it's time to replace a bra; directions on how to properly use the device; and/or any additional bra fitting educational information.

In certain embodiments the display of bra fitting educational information may be located on one or more parts of the measuring strip in any configuration. The display of bra fitting educational information may be located directly on the device or accompany the device on a separate medium. The display of bra fitting educational information may also be translated into any language.

In certain embodiments, the size of the device may also be extended or shortened to accommodate any amount of bra fitting educational information. The components of the device (i.e. the first closure element, the second closure elements, charts, etc.) may be arranged in any configuration, design appearance and/or quantities to accommodate different size variations of the device.

In certain embodiments disclosed is an improved method for determining a bra size and choosing a bra style comprising the steps of: wrapping a measuring device comprising a measuring strip having a first closure element and a row of second closure elements around a torso to obtain an overbust measurement and an underbust measurement; fastening the first closure element of the measuring device to one of the second closure elements within the row of second closure elements on the measuring device so that the device may be worn around the torso while measuring; comparing the tightness and constraints of different measurements on the body; choosing the best measurements from the measurements compared; and referencing bra size conversion charts to determine a bra size; wherein the improvement comprises opening and closing the measuring device to reveal more information displayed on the measuring device related to bra fitting and using the displayed information to make a bra size and bra style selection.

Offering bra fitting educational information directly on the device allows for a complete bra fitting without the need of third-party assistance. A user of the device would not only be able to feel the tightness, comfort, and support of each bra size measurement on the body but also have the needed knowledge to make an educated decision on the best bra to purchase.

By providing alternative sister sizes on the device, a bra size can be adjusted if a particular bra brand runs smaller or larger than other bra brands. The simplicity of the invention helps to remove the guess work and assumptions that can be made during bra fittings which may lead to an inaccurate bra selection. The disclosed invention can be used over a tight fitting shirt or an existing bra if the bra does not have additional padding. The invention described herein is light weight, compact and portable which can be used anywhere including a store dressing room, or in the privacy of a home, which may be particularly useful when purchasing bras online.

In one embodiment of the invention the measuring strip is non stretchable and made of soft fabric to mimic the feel of an actual bra band when measuring the underbust of the user. This will provide the user with a better simulation of how the chosen measurement size will feel once a bra is worn on the body.

In one embodiment of the invention the measuring strip is made of fiberglass or silicone material resembling a measuring tape. This will allow the device to be wiped down and sanitized between uses which can be beneficial for a professional bra fitter using the device to service multiple customers.

In one embodiment of the invention the measuring device is shortened, and the size range is limited. This embodiment may be intended to appeal to a younger user who may be developing breast and/or going through puberty.

In one embodiment of the invention the device is extended to accommodate larger sizes. The cup size range may be extended and/or the band sizes may be extended. This embodiment may be intended to service larger busted individuals.

BRIEF DESCRIPTION OF THE FIGURES

The detailed description of some embodiments of the invention will be made below with reference to the accompanying figures, wherein the figures disclose one or more embodiments of the present invention:

FIG. 5A illustrates the first section of the device.

FIG. 5B illustrates the second section adjacent to the first section.

FIG. 5C illustrates the third section adjacent to the second section.

FIG. 5D illustrates the fourth section adjacent to the third section.

FIG. 5E illustrates the fifth section adjacent to the fourth section.

FIG. 5F illustrates the sixth section adjacent to the fifth section.

FIG. 5G illustrates the seventh section adjacent to the sixth section.

FIG. 8 illustrates the bra sizing charts with U.K. size conversion.

FIG. 9 illustrates the bra fitting educational information as proper bra care and signs of when it is time to replace a bra.

FIG. 10 illustrates the bra fitting educational information as signs of an ill-fitting bra.

DETAILED DESCRIPTION OF THE INVENTION

Figure 1:
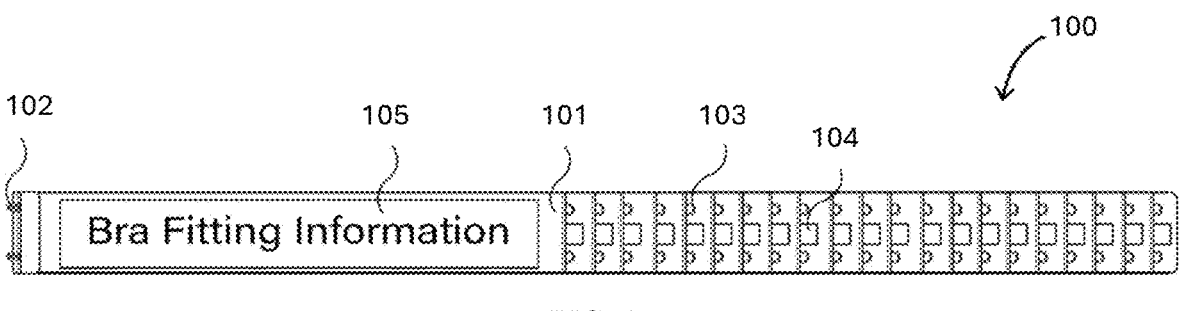
FIG. 1 is a front or first side plan view of the present invention in a closed position showing the outer top surface.

According to various embodiments, the invention will now be described with reference to FIGS. 1 to 10.

The bra size measuring device 100 comprises a measuring strip 101, a first closure element 102, a row of second closure elements 103, number indicia 104, bra fitting educational information 105, bra size measurement conversion charts 106, and directions 107 on how to use the invention.

Figure 2:
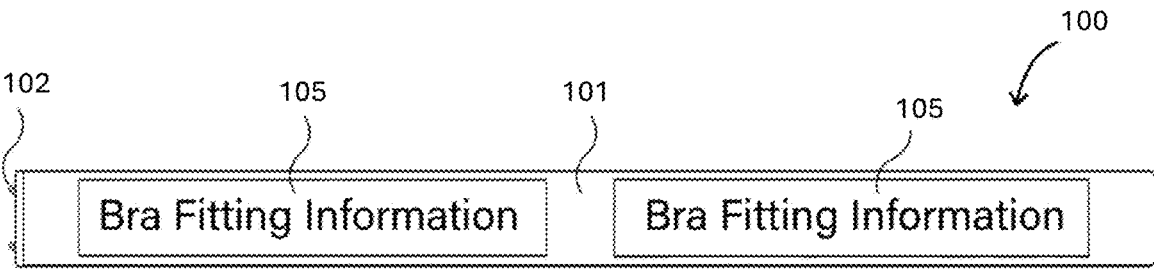
FIG. 2 is a rear or second side plan view of the present invention in a closed position showing the outer bottom surface.
Figures 3, 4:
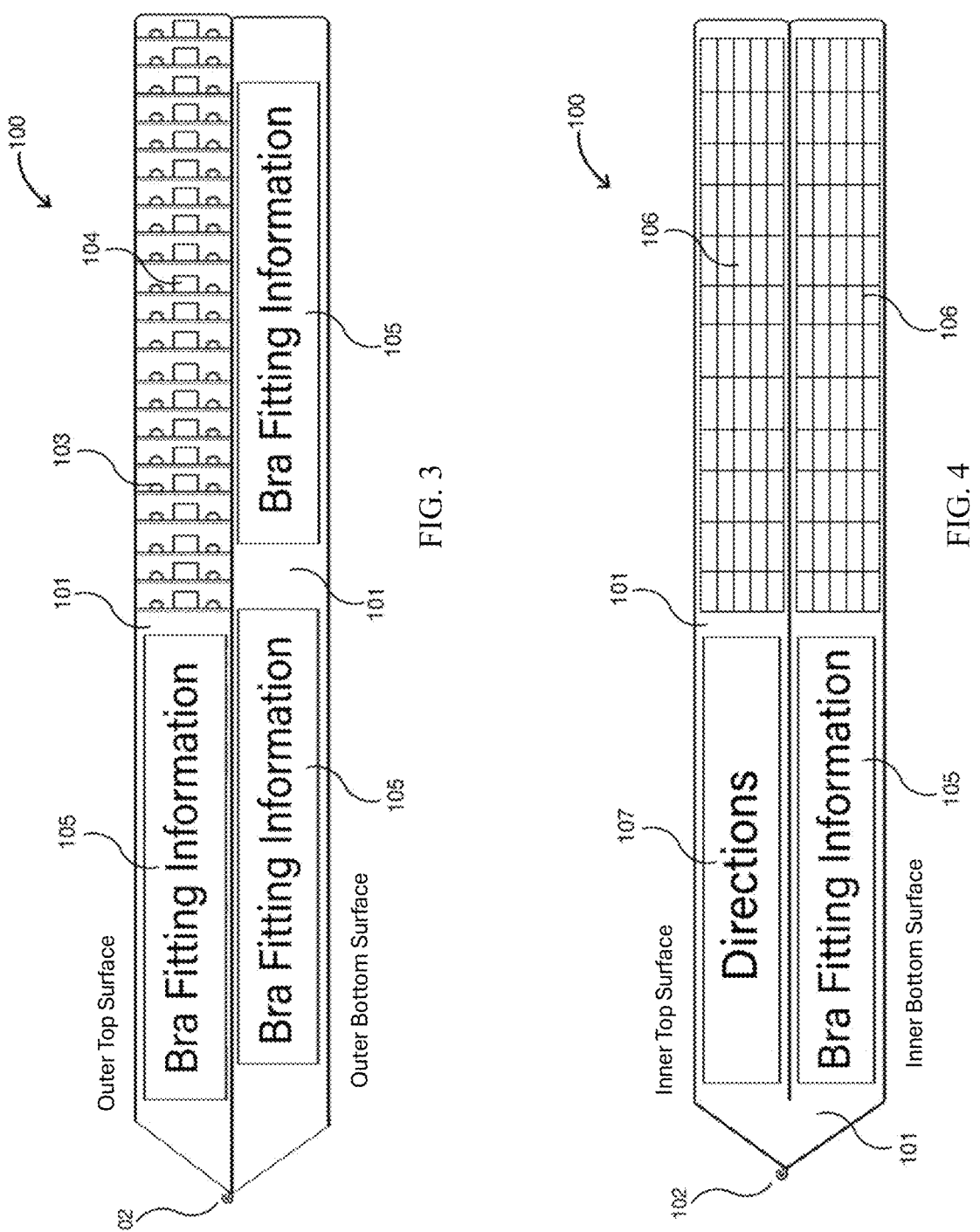
FIG. 3 is a plan view of the present invention in an open position showing the outer top surface and the outer bottom surface.
FIG. 4 is a plan view of the present invention in an open position showing the inner top surface and the inner bottom surface.
Figures 6, 7:
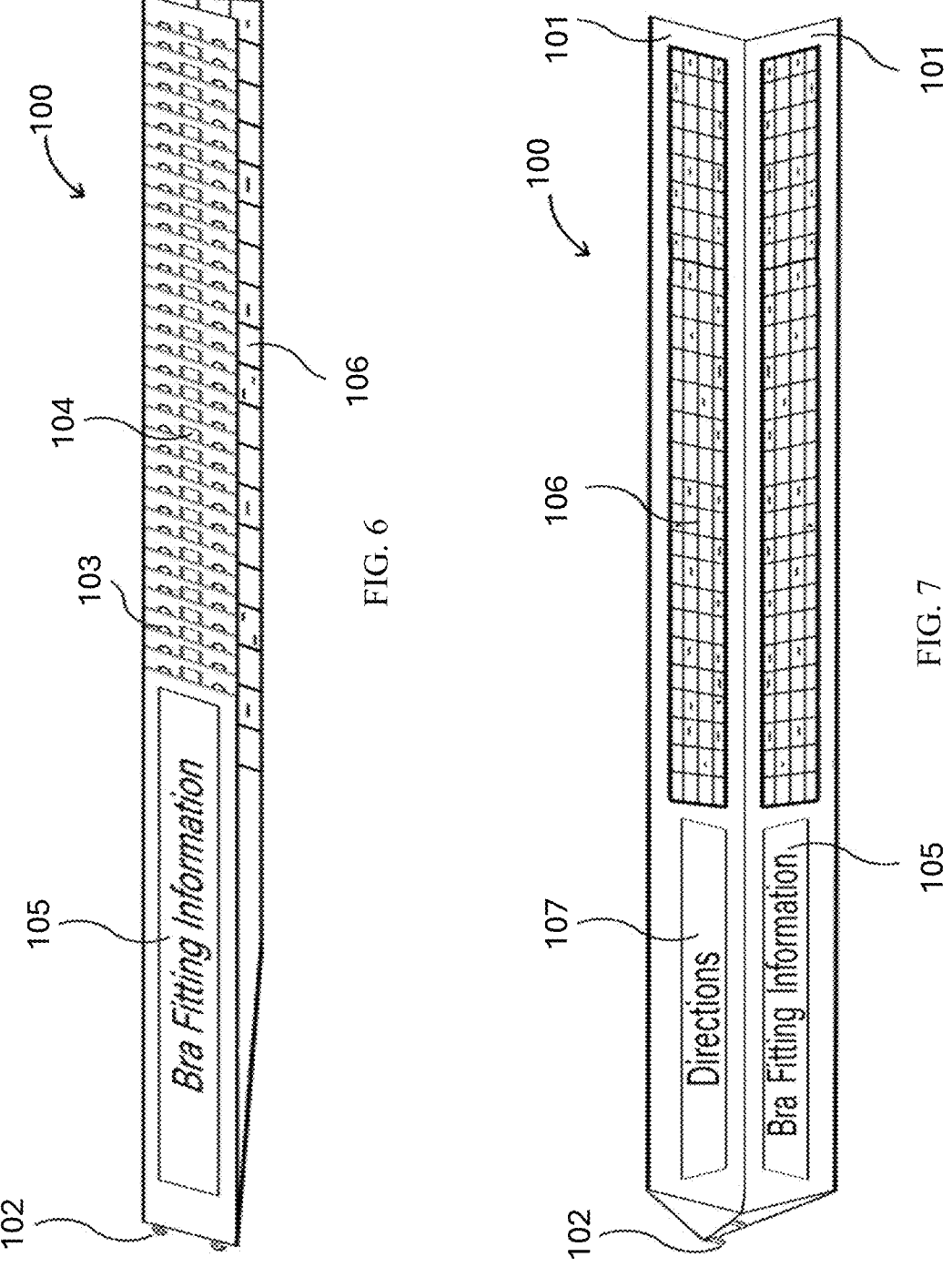
FIG. 6 is a front prospective view of the present invention in a slightly closed position showing the outer top surface and part of the inner bottom surface.
FIG. 7 is a prospective view of the present invention in an open position showing the inner top surface and the inner bottom surface.

To make the invention a measuring strip 101 is assembled out of any non-stretch material suitable for measuring a torso. The measuring strip 101 is the main structure of the bra size measuring device 100. The measuring strip 101 is folded transversely to create four surfaces. The four surfaces created are the outer top surface and the outer bottom surface as shown in FIG. 3, and the inner top surface and the inner bottom surface as shown in FIG. 4. The measuring strip 101 may be constructed in any alternative fashions such as binding or stitching to create the different surfaces. By folding the measuring strip transversely, the device is able to open and close. FIG. 6 is a representation of the measuring device 100 in a slightly closed configuration illustrating the transverse folding of the measuring strip 101 creating multiple surfaces. FIG. 1 illustrates the front side of the measuring device 100 with the measuring strip 101 folded in a closed position showing the outer top surface. FIG. 2 illustrates the back side of the measuring device 100 with the measuring strip 101 folded in a closed position showing the outer bottom surface. When the measuring device 100 is in an open position, the outer top surface and the outer bottom surface become positioned to be side by side as shown in FIG. 3. Opening the measuring device 100 exposes the inner top surface and the inner bottom surface of the measuring strip 101 as shown in FIG. 4 and FIG. 7.

According to the exemplary embodiment, the second closure elements 103 and number indicia 104 are located on the outer top surface, as shown in FIG. 1 and FIG. 3. The first closure element 102 is located on a far end of the measuring strip 101 positioned for interlocking engagement with the second closure elements 103. As shown in FIG. 3 and FIG. 4, the four surfaces of the measuring strip 101 are joined together at the end of the measuring device 100 where the first closure element 102 is located. Joining the four surfaces together at the far end of the measuring device 100 where the first closure element 102 is located, gives the measuring strip 101 a stable anchorage point for the tension created between the first closure element 102 and the second closure elements 103 while measuring around a torso. At the opposite end of the measuring strip 101 where the first closure element 102 is not located, the four surfaces are not joined together so that the measuring strip 101 may open and close with ease.

Figure 5A:
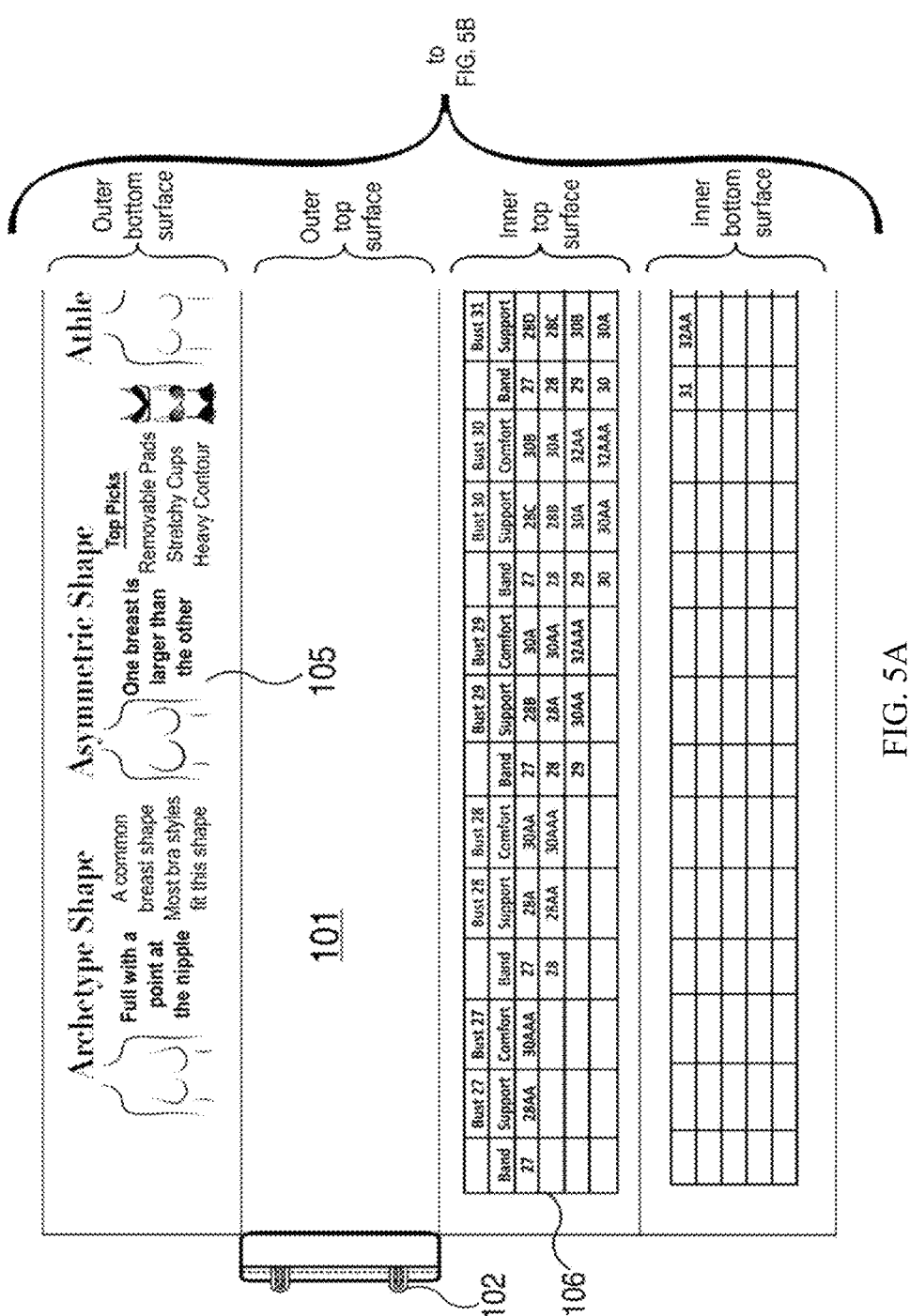
FIGS. 5A-5G illustrate the device in an unfolded deconstructed manner showing the layout of the bra fitting educational information in an exemplary embodiment, wherein for the purpose of illustrating the entire length of the device in an enlarged detailed view, each of the figures show a different section of the device.
Figure 5B:
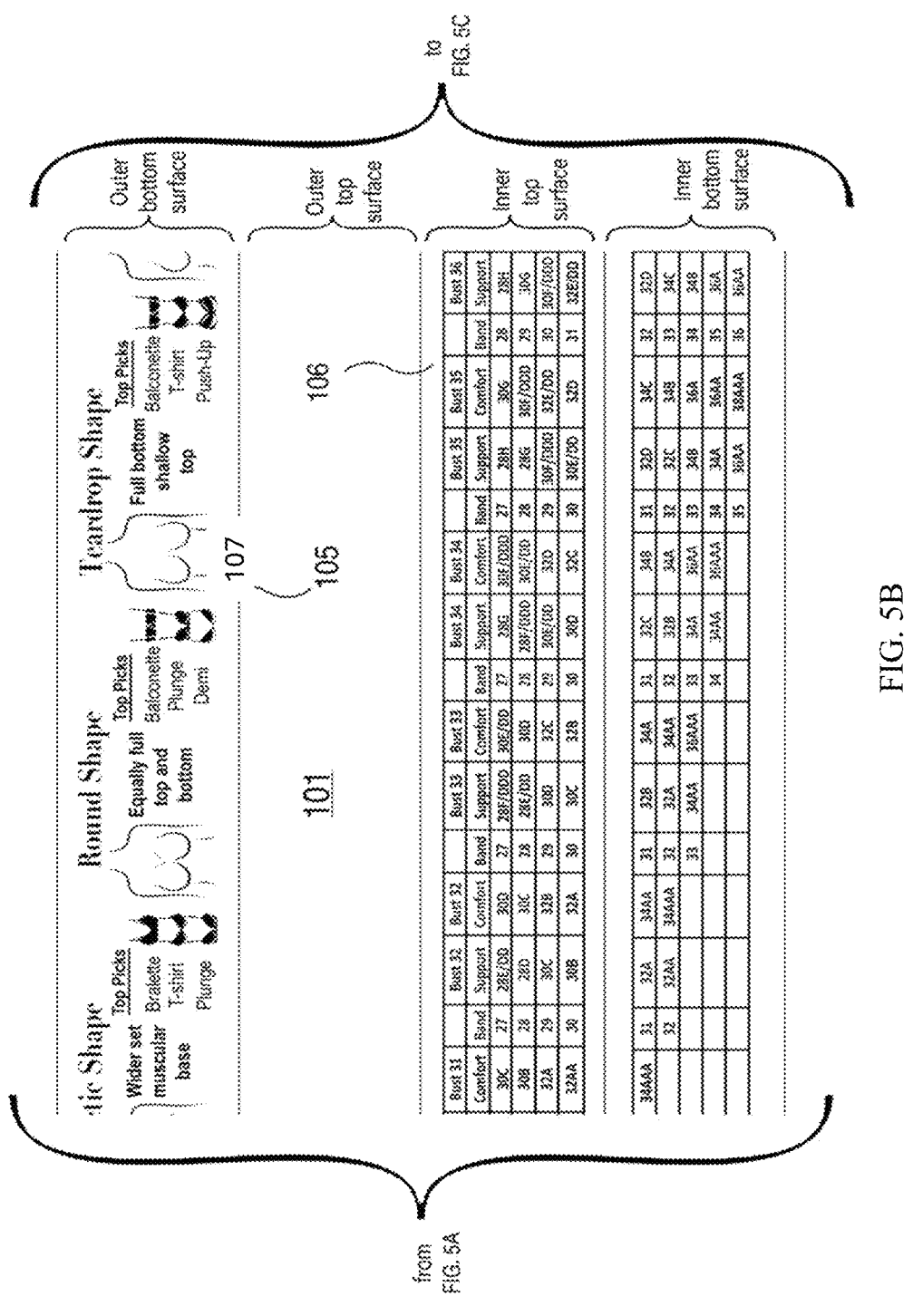
Figure 5C:
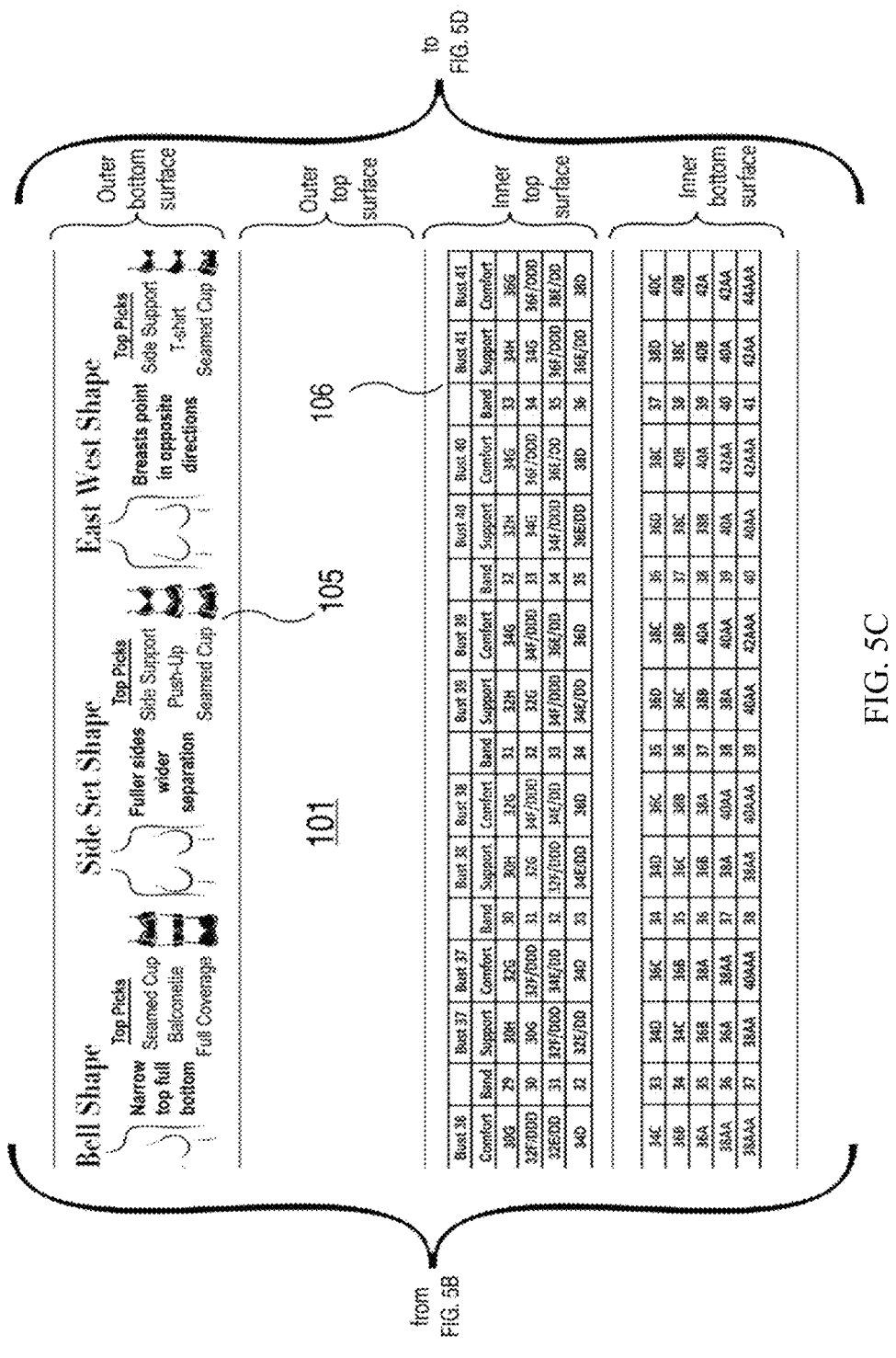
Figure 5D:
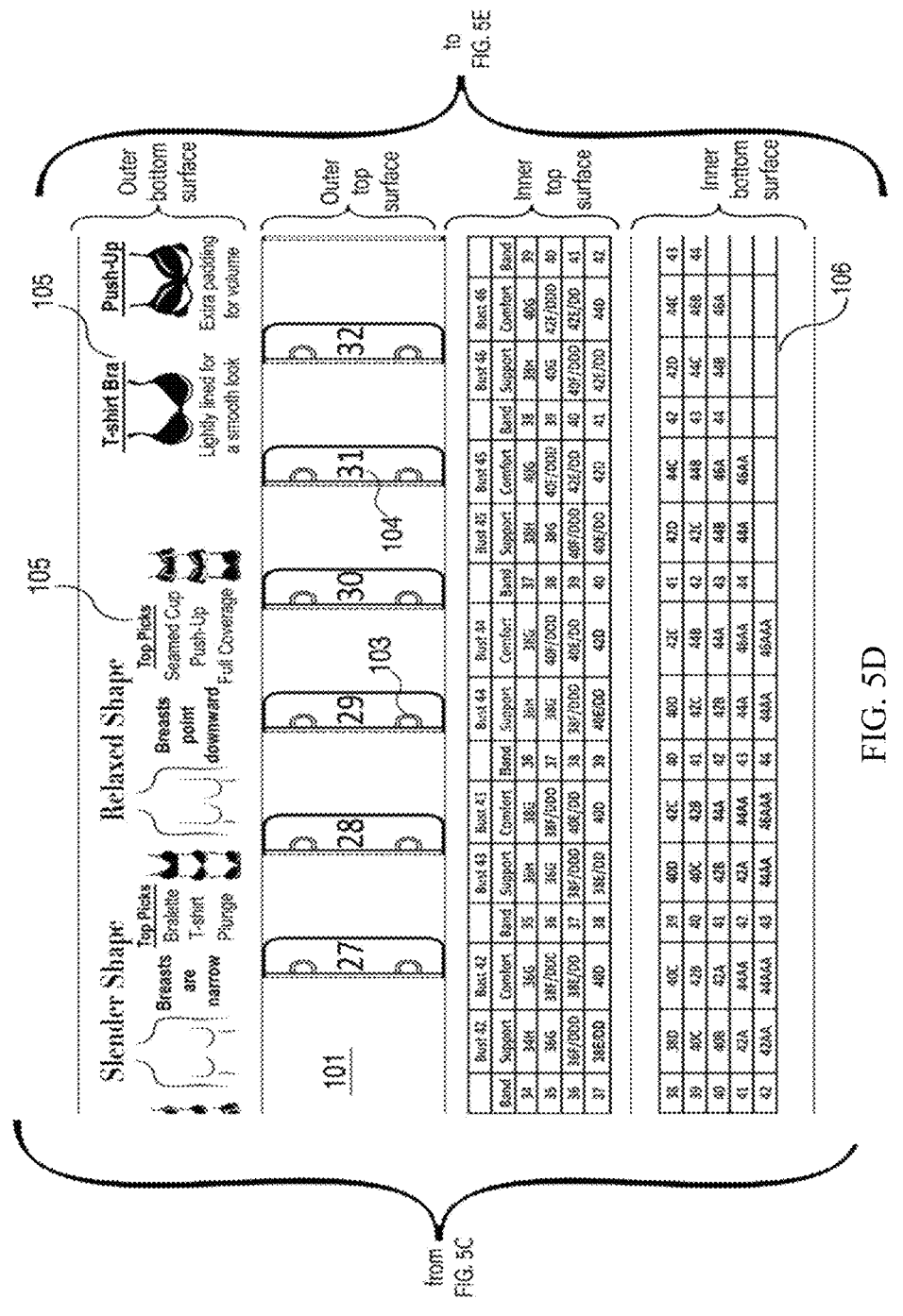
Figure 5E:
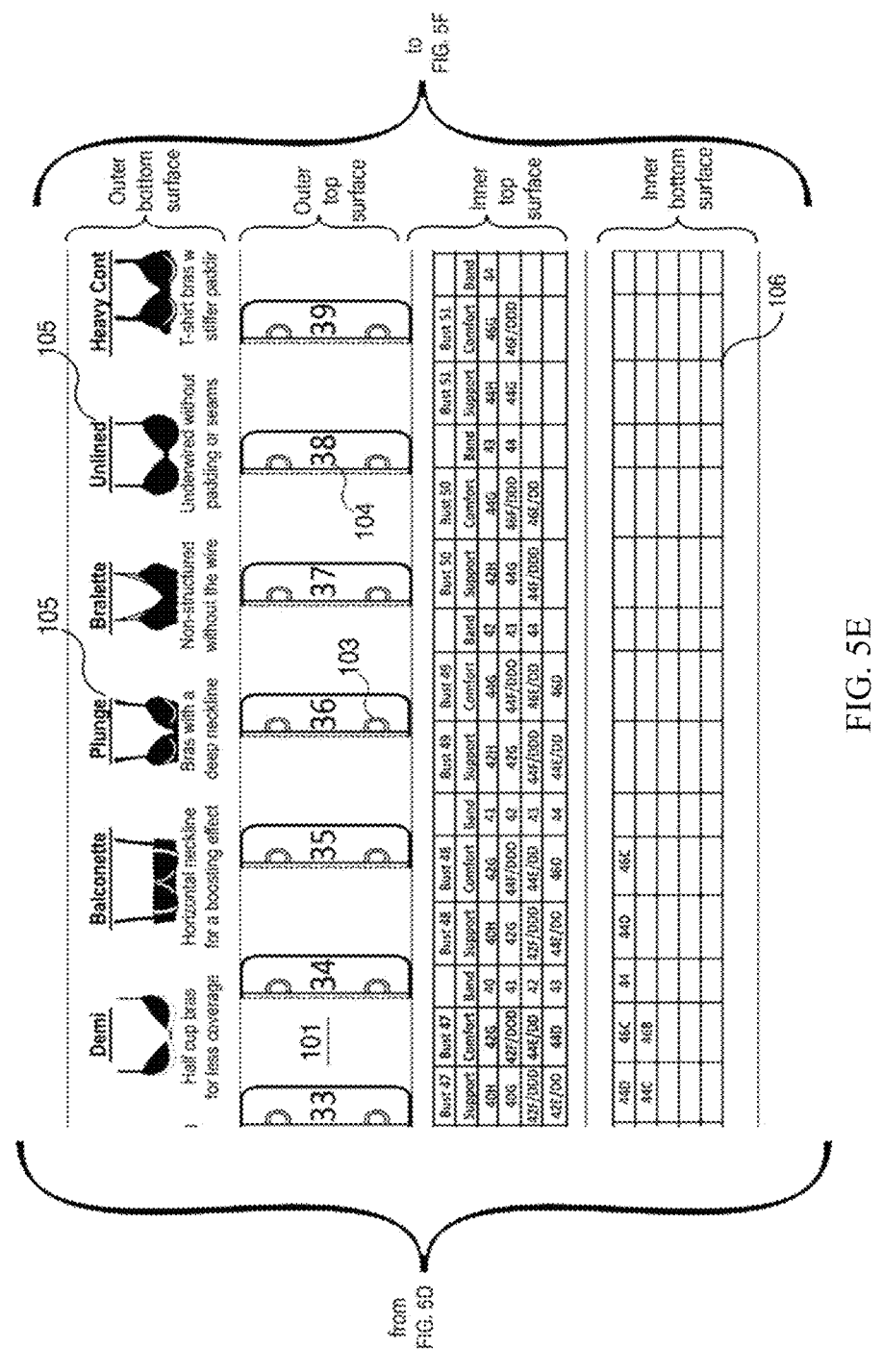
Figure 5F:
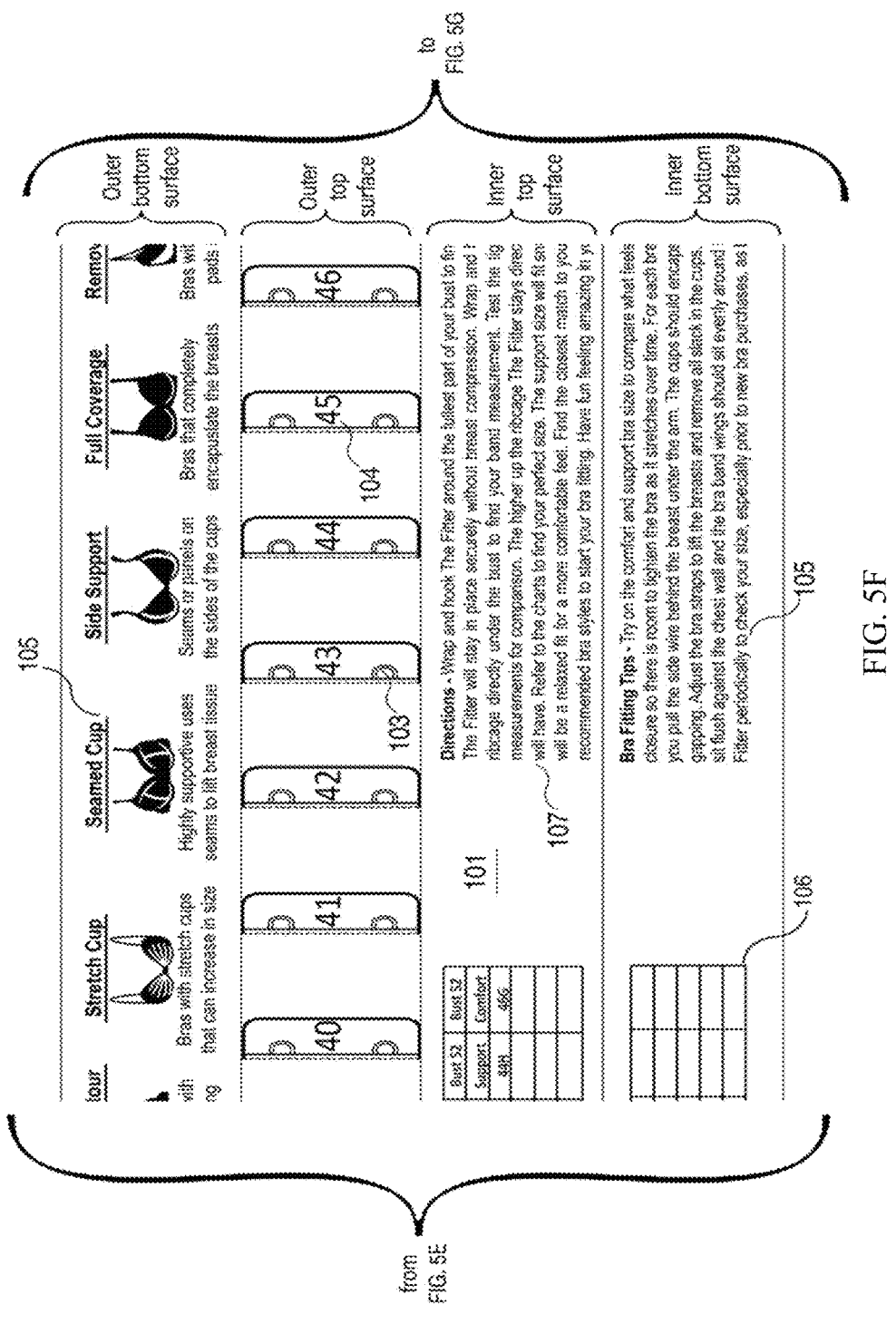
Figure 5G:
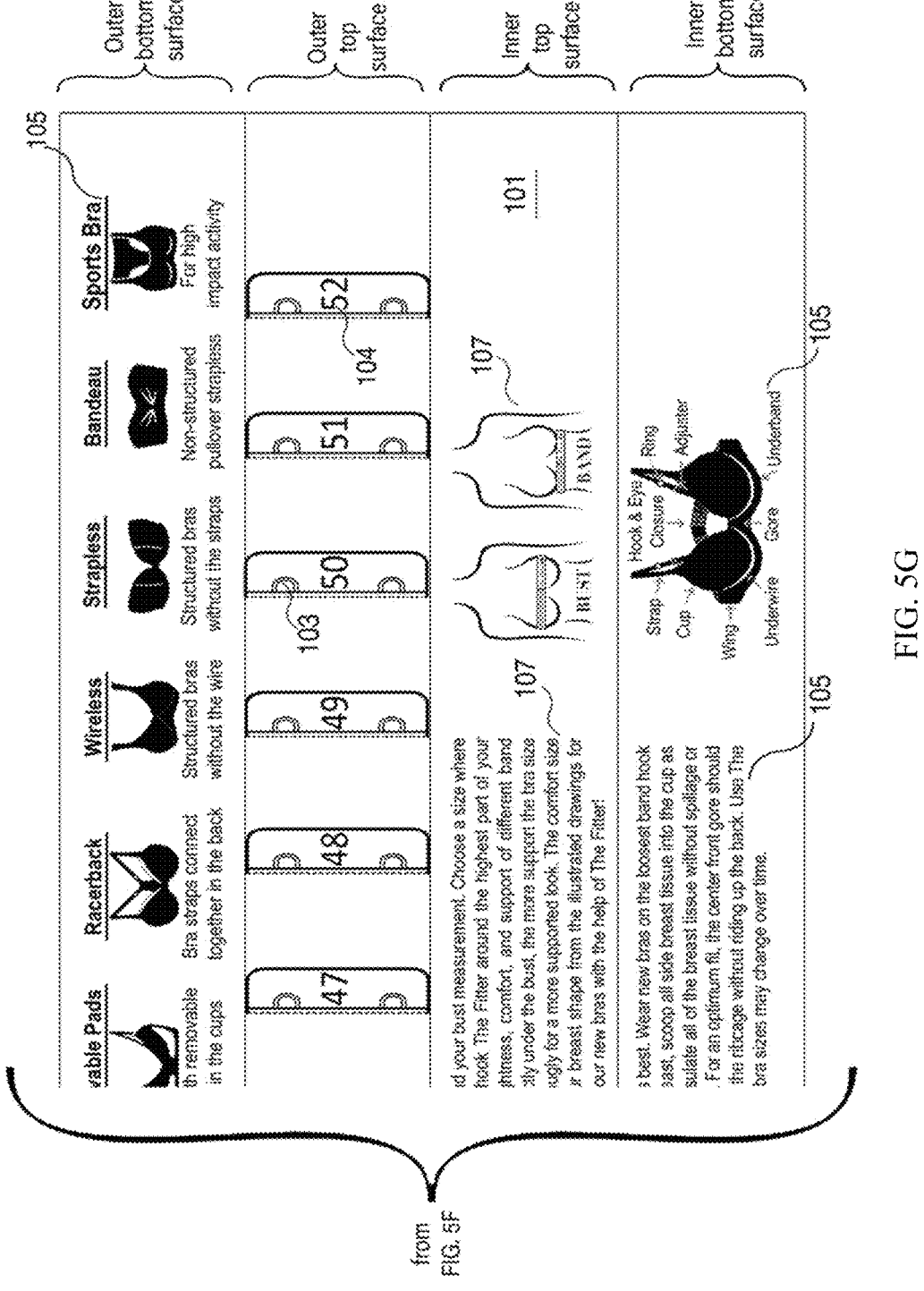

According to the exemplary embodiment, the bra sizing charts 106 may be displayed on the inner top surface and the inner bottom surface of the measuring strip 101 as shown in FIG. 4 and FIG. 7. Spreading the charts 106 between the two inner surfaces allows for the charts 106 to be slightly enlarged for easier reading. Educational bra fitting information 105 may be attached to or printed directly onto the measuring strip 101 in addition to the charts 106 as shown in FIGS. 1-7. The educational bra fitting information 105 may be any information pertaining to bra fitting. Examples of some of the educational bra fitting information 105 may include different breast shapes and the corresponding bra style recommendations for each shape as shown in FIGS. 5A-5D, different bra styles and recommended uses for each bra style as shown in FIGS. 5D-5G, bra fitting tips on how to properly adjust the components of a bra on the body as shown in FIGS. 5F-5G, and the anatomy of a bra as shown in FIG. 5G. Directions 107 on how to use the invention may also be displayed on any of the surfaces of the measuring strip 101. FIG. 4 and FIGS. 5F-5G shows the directions 107 displayed on the inner top surface of the measuring strip 101.

Other educational bra fitting information 105 may be interchanged or added to the device. FIG. 9 shows an example of bra fitting educational information 105 displayed as proper bra care and signs of when it's time to replace a bra, and FIG. 10 shows an example of bra fitting educational information 105 displayed as signs of an ill-fitting bra. Other bra fitting educational information 105 that can be displayed on the measuring device 100 may include but is not limited to: how to fix the ill fit of a bra; how to adjust the bra size according to how the bra is fitting on the body; and how to find an alternative comfort size or sister size. Sister size is a term in the lingerie industry used to explain two bra sizes that have the same cup volume capacity but different band lengths. To find a bra's sister size, the cup size is adjusted up one cup size and the band size adjusted down one band size or the cup size is adjusted down one cup size and the band size adjusted up one band size. For example, if one determines that a 34C bra size fits in the cup, but the bra band feels too tight around the ribcage, they would adjust the bra band size to the next size up which would be 36, but the cup size would be adjusted down to a B cup. On the other hand, if one determines that a 34C bra size fits in the cup but the bra band feels too loose around the ribcage, they would adjust the bra band size down to a 32 and the cup size up to a D cup. The charts 106 of the claimed invention have been improved to include a looser fitting sister size option for each calculated bra size. To relay sister sizing in layman's terms on the device, the nomenclature of support and comfort is used for the two sizes of each bra size measurement combination as shown in FIGS. 5A-5F. The support size being the tighter fitting band size and the comfort size being the looser fitting band sister size.

In a preferred embodiment, the best mode for making the invention is to first print the bra fitting educational information 105, charts 106 and the number indicia 104 onto a non-stretch material such as cotton or polyester using fabric dye, direct to garment, direct to film, screen printing, sublimation printing or any other type of printing technology. The layout of the printed media would be on one side of a piece of material measuring approximately 4 inches in width and 53 inches in length. This embodiment is designed to measure bra sizes from 28AA to 44H. The layout of the printed media would align so that once the material is folded, each surface area from the folds would be approximately one inch in width and the printed media would be centered within each one inch surface area. FIGS. 5A-5G shows an exemplary embodiment of the layout of the printed media on a deconstructed unfolded piece of measuring strip 101 material. The second step to constructing the invention once the strip of material is printed, is to attach the second closure elements 103 in alignment with the number indicia 104. In a preferred embodiment the second closure elements 103 are eye closures resembling the eye closures on a bra closure. The eye closures would be sewn on top of the measuring strip 101. The third step is to fold the piece of material in half transversely with the second closure elements 103 facing out so that the material reduces from 4 inches in width to 2 inches in width. The non printed back side of the material that shows the thread where the eye second closure elements 103 are attached would be hidden in between the fold. The inner top surface and inner bottom surface would be on one side of the measuring strip 101 as shown in FIG. 4, and the outer top surface and outer bottom surface would be on the other side of the measuring strip 101 as shown in FIG. 3. The measuring strip 101 would then be folded in half transversely again. The width of the measuring strip 101 would reduce from 2 inches to 1 inch with the outer top surface and the outer bottom surface facing out and the inner top surface and the inner bottom surface in between the fold. The measuring strip 101 would then be starched and pressed to keep the folds crisp. The final step to constructing the device 100 is to attach the first closure element 102 to the end of the measuring strip 101 and connecting the four surfaces at the end of the measuring strip 101 together. In an exemplary embodiment the first closure element 102 is a pair of hooks resembling the hooks found on the back of a bra closure. The pair of hooks would be sewn at the end of the measuring strip while simultaneously sewing the four surface ends of the measuring strip 101 together.

To operate the measuring device 100 a user would find their most desirable overbust measurement. With the device 100 in a closed position and the second closure elements 103 facing away from the body, the user would wrap the measuring device 100 around their torso at the apex of the bust across the nipple line and fasten the first closure element 102 to an individual second closure element 103. The user would want to ensure that the device sits evenly around their torso. The user may try out different second closure elements 103 for determining the best size, choosing a size that would allow the measuring device 100 to be worn securely across the nipple line without the need of having to hold the measuring device 100 in place. The user would also ensure the measuring device 100 is not unduly constricting indicated by the measuring device 100 excessively compressing the breast tissue. The best overbust circumference measurement chosen by the user would be the user's bust measurement.

The user would also find their most desirable underbust circumference measurement by wrapping the measuring device 100 around their torso directly under the bust and fastening the first closure element 102 to an individual second closure element 103 of their liking. The user would test the comfort of different underbust circumference measurements indicated by how tightly the measuring device 100 feels, and the support of different underbust circumference measurements indicated by the orientation of where the measuring device 100 sits around the user's torso with reference to the underbust breast roots. Breast roots is a term used to indicate the point on the body where the breast tissue is attached to the chest wall. Choosing a tighter underbust circumference measurement secures the measuring device 100 higher up the torso under the bust bringing the measuring device 100 closer to the underbust breast roots. Choosing a looser underbust circumference measurement secures the measuring device 100 further down the torso under the bust bringing the measuring device 100 further away from the underbust breast roots. The closer the measuring device 100 is to the underbust breast roots when measuring the underbust, the more support the chosen circumference measurement size will have. The user would choose their underbust measurement according to their subjective comfort and support level and that underbust measurement would be the user's band measurement.

The user would then take the chosen bust and band measurements and reference the charts 106 to obtain their bra size. The user would open the device 100 to see the charts 106 and the additional bra fitting educational information 105. The user would use the bra fitting information 105 on the different surfaces of the measuring strip 101 to make an educated decision on which bras to purchase. When shopping for bras the user would be able to choose between the comfort and support bra size depending on how the bra fits and feels. The comfort and support feature of the bra sizing charts 106 can also be used for extended bra sizes that include U.K. size conversions. An example of this is shown in FIG. 8.

It shall be appreciated that the number of closure elements used for the first closure element 102 and the number of closure elements used for the second closure elements 103 on each measurement increment may increase or decrease along the width of the device (i.e., two second closure elements 103 eye loops per measurement increment can be changed to three second closure elements 103 eye loops per measurement increment or vice versa) depending on the width of the measuring device 100. The first closure element 102, second closure elements 103, number indicia 104, bra fitting educational information 105, charts 106, and directions 107 may be added or removed in various quantities and placed on any surface of the measuring strip 101. The length and width of the measuring device 100 may increase or decrease and the size range that the measuring device 100 measures may increase or decrease. The measuring device 100 may be of any size for accommodating any number of first closure elements 102, second closure elements 103, number indicia 104, bra fitting educational information 105, and charts 106. The bra size range, bra fitting educational information 105, charts 106 configuration, style, and/or language of the bra size conversion charts 106 and/or bra fitting educational information 105 may vary in alternate embodiments.

It shall be appreciated that the disclosed device can have multiple configurations in different embodiments and may be adapted for use in one or more different countries based on the sizing metric system and/or language of the country. In some embodiments the disclosed device may be used for determining other measurements, such as head size, waist size, or any other circumference size of a body part. The charts 106 may also be reconfigured to represent different body part measurements. It shall be appreciated that the components of the disclosed device including the first closure element 102, second closure elements 103, number indicia 104, bra size conversion charts 106, bra fitting educational information 105, and directions 107 may be provided in various formats that may incorporate artistic elements, and may be placed at different locations, and/or relative orders on the measuring strip 101. It shall be understood that any material described as "printed on the measuring strip 101" may be printed directly on the measuring strip 101 or may be printed on a separate material which may be attached to the measuring strip 101. In other embodiments, some or all of these components printed on the measuring strip 101 may be omitted or provided on a separate physical or electronic medium outside of the measuring strip 101. Other elements may also be printed on the measuring strip 101, such as logos, artwork, advertisements, etc.

It shall be appreciated that the device and methodology described herein may comprise any alternative known materials in the field and be of any color, size, and/or dimensions. It shall be appreciated that the device may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated measuring device 100 or elements must have a specific orientation or are constructed and operated in a specific orientation, and therefore should not be construed as a limitation of the present invention.

The constituent elements of the disclosed device listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' 'substantially,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the invention. Thus, given the wide variety of configurations and arrangements of embodiments of the present invention the scope of the invention is reflected by the breadth of the claims below rather than narrowed by the embodiments described above.

We claim:

1. A bra size measurement device comprising a measuring strip, a first closure element, a row of second closure elements that are numbered and/or labeled, and a group of bra size measurement conversion charts, wherein the improvement comprises:

the measuring strip comprising a length of continuous strip material having a outer top surface to which the row of second closure elements is attached, a inner top surface and a inner bottom surface where the group of bra size measurement conversion charts are located, and a outer bottom surface where additional bra fitting educational information may be displayed;

wherein the outer top surface is on the reverse side of the inner top surface, and the inner bottom surface is on the reverse side of the outer bottom surface, and the measuring strip is transversely folded or constructed in any fashion so that the measuring strip may open and close in a book-like fashion exposing the inner top surface and the inner bottom surface when the measuring strip is in an open position;

wherein when the measuring strip is in a closed position and the inner top surface and the inner bottom surface are aligned and directly facing each other, the outer top surface, the inner top surface, the inner bottom surface, and the outer bottom surface are joined together and share a common top linear edge of the measuring strip, and the outer top surface and the inner top surface share a common bottom linear edge, and the inner bottom surface and the outer bottom surface share a common bottom linear edge, in which the common bottom linear edge of the outer top surface and the inner top surface is separated from the common bottom linear edge of the inner bottom surface and the outer bottom surface;

the top linear edge and the bottom linear edges being oppositely disposed and spanning the length of the strip material;

the measuring strip further including a first side edge to which the first closure element is attached, the first side edge extending between a first end of the common top linear edge and a first end of the bottom linear edges, wherein the first side edge closes and binds together a first end of the outer top surface, a first end of the inner top surface, a first end of the inner bottom surface, and a first end of the outer bottom surface of the measuring strip;

a set of second side edges extending between a second end of the common top linear edge and a second end of the bottom linear edges, wherein the set of second side edges are connected at the second end of the common top linear edge and are separated at the second end of the bottom linear edges;

an array of bra fitting educational information located on the surfaces of the measuring strip; and an additional column on the charts that displays alternative bra sizes known as sister sizes.

2. The bra size measuring device of claim 1, wherein additional layers of inner top surfaces and inner bottom surfaces may be added to the device by inserting measuring strip material within the fold of the device and adhering the additional material to the top linear edge of the device or, layers may be removed from the device so that the device may only have one front surface and one back surface.

3. The bra size measuring device of claim 1, wherein the array of bra fitting educational information may include different breast shape illustrations and descriptions with matching bra style recommendations, the anatomy of a bra and how to properly adjust the components of a bra on the body, signs of an ill-fitting bra and how to fix the ill fit, how to adjust the bra size according to how the bra is fitting on the body, how to find an alternative comfort size or sister size, bra style descriptions and suggested uses, proper bra care, signs of when it's time to replace a bra, directions on how to properly use the device, and/or any additional educational information that can improve bra fitting.

4. The bra size measuring device of claim 1, wherein display of bra fitting educational information may be located on one or more parts of the measuring strip in any configuration.

5. The bra size measuring device of claim 1, wherein the display of bra fitting educational information may be located directly on the device or accompany the device on a separate medium.

6. The bra size measuring device of claim 1, wherein the display of bra fitting educational information may be translated into any language.

7. The bra size measuring device of claim 1, wherein the alternative bra sizes are bra sister sizes and may be labeled in the charts under different nomenclature such as comfort and support sizes or any other nomenclature.

8. The bra size measuring device of claim 1, wherein the size of the device may be extended or shortened to accommodate any amount of bra fitting educational information and the components of the device (i.e. the first closure element, the second closure elements, charts, etc.) may be arranged in any configuration, design appearance and/or quantities to accommodate different size variations of the device.

9. A method for determining a bra size and choosing a bra style comprising the steps of:

wrapping a measuring device comprising a measuring strip having a first closure element and a row of second closure elements around a torso to obtain an overbust measurement and an underbust measurement, fastening the first closure element of the measuring device to one of the second closure elements within the row of second closure elements on the measuring device so that the device may be worn around the torso while measuring, comparing the tightness and constraints of different measurements on the body, choosing the best measurements from the measurements compared and referencing bra size conversion charts to determine a bra size, wherein the improvement comprises:

opening and closing the measuring device to reveal educational information displayed on the measuring device related to bra fitting;

and using the displayed information on the device to make a bra size and bra style selection.

* * * * *